United States Patent [19]

Edwards, Jr.

[11] Patent Number: 5,014,234
[45] Date of Patent: May 7, 1991

[54] SYSTEM WITH SOFTWARE USAGE TIMER AND COUNTER FOR ALLOWING LIMITED USE BUT PREVENTING CONTINUED UNAUTHORIZED USE OF PROTECTED SOFTWARE

[75] Inventor: Gordon L. Edwards, Jr., Easley, S.C.

[73] Assignee: NCR Corporation, Dayton, Ohio

[21] Appl. No.: 900,206

[22] Filed: Aug. 25, 1986

[51] Int. Cl.$^5$ .................. G06F 12/14; G06F 11/34; G06F 7/02; H04L 9/32
[52] U.S. Cl. .................. 364/900; 364/969; 364/969.4; 364/934; 364/921.8; 364/921.9; 364/270; 364/286.4; 364/286.5; 364/246.6; 364/246.9; 364/251.4; 364/251.3; 380/4
[58] Field of Search .................. 340/825.31, 825.32, 340/825.33, 825.34; 380/20, 23, 17, 4, 25; 364/200 MS File, 900 MS File

[56] References Cited

U.S. PATENT DOCUMENTS

| | | | |
|---|---|---|---|
| 3,827,029 | 7/1974 | Schlotterrer | 364/200 |
| 4,040,034 | 8/1977 | Belady | 364/200 |
| 4,206,315 | 6/1980 | Matyas et al. | 178/22 |
| 4,333,074 | 6/1982 | Sutherland et al. | 340/825.3 |
| 4,430,705 | 2/1984 | Cannavino | 364/200 |
| 4,439,670 | 3/1984 | Bassett et al. | 235/382 |
| 4,453,074 | 6/1984 | Weinstein | 380/24 |
| 4,454,594 | 6/1984 | Heffron et al. | 364/900 |
| 4,464,678 | 8/1984 | Schiff et al. | 358/122 |
| 4,465,901 | 8/1984 | Best | 178/22.08 |
| 4,484,306 | 11/1984 | Kulctyckyj | 364/900 |
| 4,525,599 | 6/1985 | Curran et al. | 178/22.08 |
| 4,528,589 | 7/1985 | Block et al. | 380/10 |
| 4,553,252 | 11/1985 | Egendorf | 364/900 |
| 4,558,176 | 12/1985 | Arnold | 364/900 |
| 4,562,306 | 12/1985 | Chou et al. | 178/22.08 |
| 4,590,557 | 5/1986 | Lillie | 364/900 |
| 4,593,353 | 6/1986 | Pickholtz | 364/200 |
| 4,593,376 | 6/1986 | Volk | 364/900 |
| 4,604,708 | 8/1986 | Lewis | 340/825.31 |
| 4,652,990 | 3/1987 | Pailen et al. | 364/200 |
| 4,670,857 | 6/1987 | Rackman | 380/5 |
| 4,683,553 | 7/1987 | Mollier | 235/382 |
| 4,700,386 | 10/1987 | Kohn | 380/20 |
| 4,707,804 | 11/1987 | Leal | 340/825.32 |
| 4,716,588 | 12/1987 | Thompson et al. | 380/15 |
| 4,719,566 | 1/1988 | Kelley | 340/825.34 |
| 4,740,890 | 4/1988 | William | 364/200 |
| 4,791,565 | 12/1988 | Dunham | 364/200 |
| 4,796,120 | 1/1989 | Wolfe | 364/900 |
| 4,799,635 | 1/1989 | Nakagawa | 364/900 |
| 4,823,308 | 4/1989 | Knight | 364/900 |
| 4,827,508 | 5/1989 | Shear | 380/25 |
| 4,864,494 | 9/1989 | Kobus | 340/825.31 |
| 4,885,778 | 12/1989 | Weiss | 380/25 |
| 4,924,378 | 5/1990 | Hershey | 380/4 |
| 4,932,054 | 6/1990 | Chou | 340/825.31 |
| 4,937,863 | 6/1990 | Robert | 380/4 |
| 4,951,249 | 8/1990 | McClung | 364/900 |

Primary Examiner—Archie E. Williams, Jr.
Assistant Examiner—Eric Coleman
Attorney, Agent, or Firm—Wilbert Hawk, Jr.; Albert L. Sessler, Jr.

[57] ABSTRACT

A method is provided to prevent continued unauthorized use of protected software and to maintain control of sites where software is installed. The method allows unauthorized copies of the protected software to be installed and to operate for a limited time. However, if the user does not register the software within a prescribed period of time, the protected software will be disabled. Prior to disabling, the software will operate for a period of time during which messages are provided to the user, warning that the software should be registered. Both a counter for counting the number of times that the protected software is used, and a timer for measuring the elapsed time since installation of the software, are used in determining how long the protected software will be permitted to operate before either registration or disabling.

9 Claims, 7 Drawing Sheets

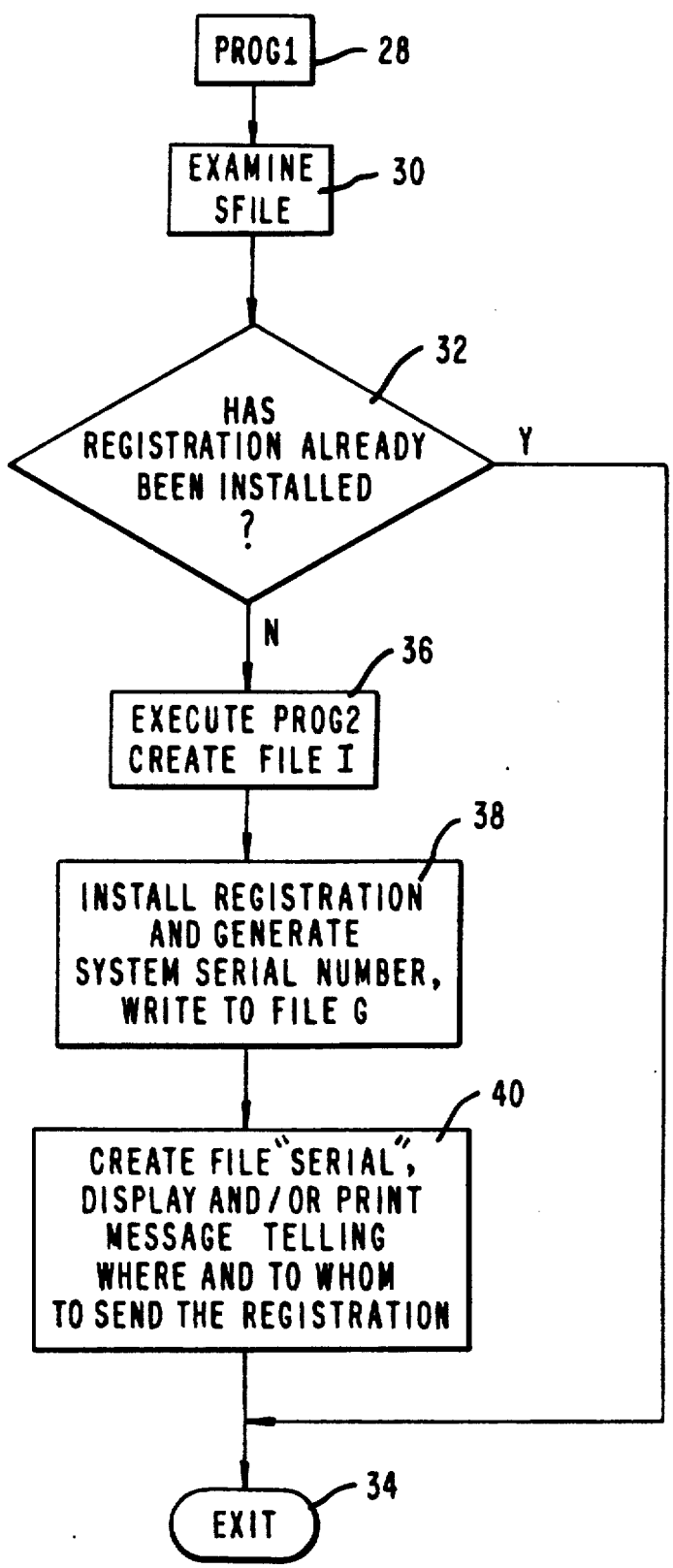

SYSTEM WITH SOFTWARE USAGE TIMER AND COUNTER FOR ALLOWING LIMITED USE BUT PREVENTING CONTINUED UNAUTHORIZED USE OF PROTECTED SOFTWARE

BACKGROUND OF THE INVENTION

Unauthorized use of proprietary computer programs is widespread. Since development costs of most software are substantial, it is necessary for developers of such software to set licensing fees for the use of such software at a sufficient level to recover such costs and to provide a profit to the developers. Such pricing provides an incentive for some users to attempt to obtain programs at lower costs by unauthorized copying or by using on several sites software which has been licensed for only one site.

Various methods have been employed for preventing the use of programs by persons who have obtained them in an unauthorized manner. Such methods include the use of a hardware "key" which must be used with the program, the encryption of programs, and the use of "trap" conditions.

SUMMARY OF THE INVENTION

The present invention relates to a method for preventing continued unauthorized use of protected software, and more particularly relates to such a method in which unauthorized use is initially permitted, and in which the user is warned that the use is unauthorized and is encouraged to obtain a proper registration of the program before the program is disabled. This method has the dual advantages of providing protection for the software and ultimately causing its destruction if a proper license is not obtained, while at the same time encouraging the unauthorized user to register the software and commence licensed use, thus providing revenue to the owner of the software. In this connection, it is noted that once the unauthorized user has commenced use of the program, he is likely to become somewhat dependent upon it, and is therefore more likely to decide to license the program, to the subsequent advantage of the owner of the program.

In accordance with one embodiment of the invention, a method for preventing continued unauthorized use of protected software in a data processing system including a clock, storage means and a counter comprises the steps of providing an initial time setting for said clock at the time of installation of the software in said data processing system; providing a constant representing a predetermined amount of time in said storage means at the time of installation of the software; incrementing the counter each time that the protected software is operated; making a first determination whenever the protected software is operated as to whether the constant has been provided in the data processing system; making a second determination as to whether the counter has reached a predetermined value; making a third determination as to whether the current time sensed from said clock exceeds the time when the software was installed by an amount equal to or greater than said constant; if any of the first, second or third determinations are true, sending a warning message to the software user indicating unauthorized use, setting the constant to a predetermined multiple of the current time setting, and switching the counter to cause it to commence decrementing from the setting at which it stood when switched; decrementing the counter each further time the software is subsequently operated; and causing the software to be disabled when the counter has been decremented to a second predetermined value.

It is accordingly an object of the present invention to provide a method for preventing continued unauthorized use of protected software in a data processing system.

Another object is to provide a method for disabling software after a period of use and a warning message if the user does not contact the proprietor of the software and obtain a defusing number.

Another object is to use a system clock in a data processing system to generate a serial number which is unique to the software system on which it was generated, and which can be used to protect said software against illegal installations.

Another object is to provide a software method to protect software against illegal installations in which a unique serial number is generated for each system using the system clock of the associated data processing system, and in which, when the software is registered with the software proprietors, a defusing number based on said serial number is returned to the user, and is employed to prevent disabling of the software, as would otherwise take place in the case of an illegal installation.

With these and other objects, which will become apparent from the following description, in view, the invention includes certain novel features, a preferred form or embodiment of which is hereinafter described with reference to the drawings which accompany and form a part of this specification.

BRIEF DESCRIPTION OF THE DRAWINGS

FIG. 2 is a flow diagram of the registration installation phase of the method for software protection.

DESCRIPTION OF THE PREFERRED EMBODIMENT

Figure 1:
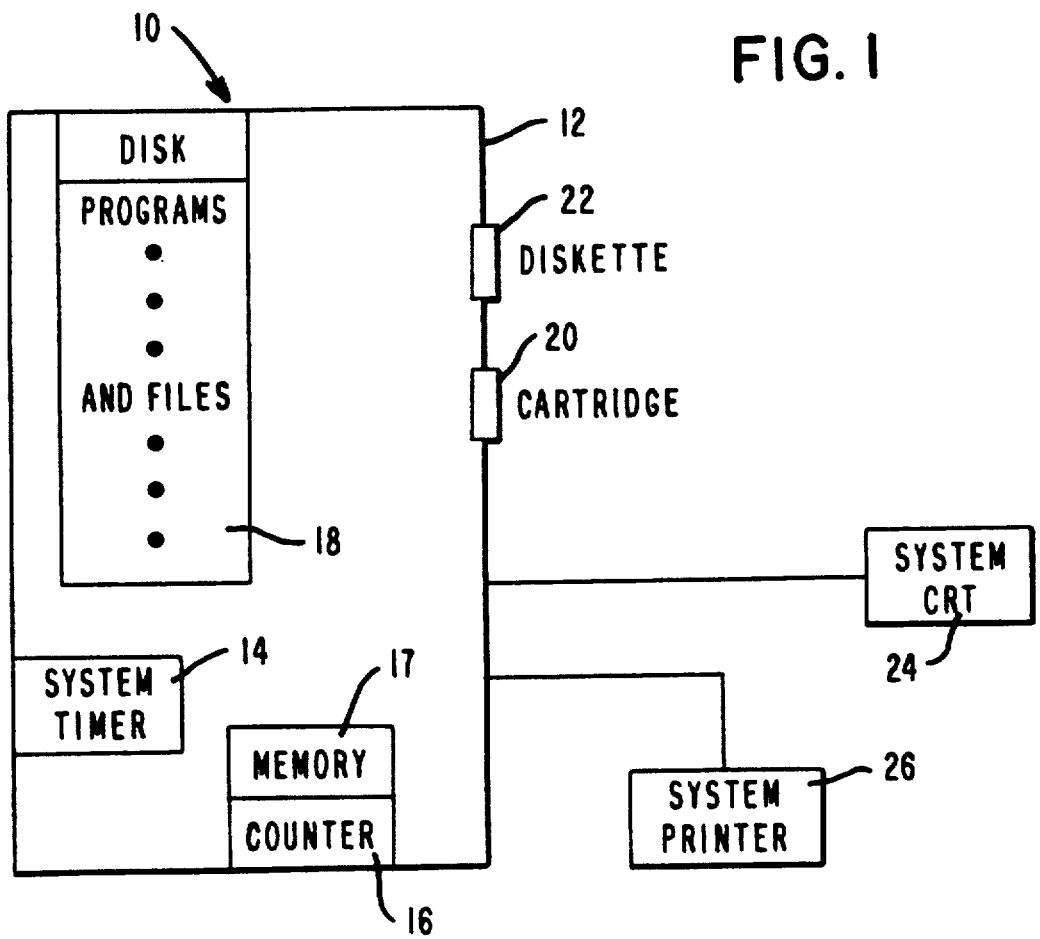
FIG. 1 is a block diagram of a data processing system in which the method for software protection of the present invention may be employed.

Referring now to FIG. 1, there is shown a block diagram of a data processing system 10 in which the method for software protection of the present invention may be employed. The data processing system comprises a processor 12 which includes a system timer or clock 14 and a counter 16, which is included in a memory section 17. The processor also includes storage capability, such as a disk storage unit, indicated generally by reference character 18, in which programs, files and other data may be stored, as well as an arithmetic unit, a control unit, and other units which are conventional and not specifically illustrated. Data, including programs and files, may be loaded into the disk storage 18 of the processor 12 by suitable means, such as a tape cartridge 20 or a flexible diskette 22. Output from the processor 12 may be displayed on a system CRT 24 and may be provided in printed form by a system printer 26.

The software which will now be described functions to prevent continued unauthorized use of protected software and to maintain control of sites where the protected software is installed. The method of protection hereinafter described permits unauthorized copies of the protected software to be installed and to operate for a period of time. However if the user does not register the protected software within a predetermined period of time, the protected software will be destroyed. Before it is destroyed, the protected software will operate for another predetermined period of time, but will give a warning message each time that the protected software is executed, informing the user that the software should be registered.

The method disclosed herein provides further protection to the protected software in that even if the protected software is re-installed, as for example from flex disks or tape, on the same system in an unauthorized manner after having been destroyed, it still will not function properly. The only way that the protected software can be made to operate again is to register it and make payment for it.

The present method employs a set of registration data which is appended to a selected system file which is resident in the operating system of the installation, and is not part of the software to be protected. Therefore reinstalling the software will not reset or re-initialize the registration data. Data relating to the timer and counter that were started when the protected software was originally installed will still be in effect even if the protected software is reinstalled.

For purposes of illustration, the operating system file containing the registration data is designated as the SFILE. A suitable file is one which is relatively small, which is used in many other routines, and which is therefore unlikely ever to be deleted.

The registration data may comprise various types of information. In the illustrated embodiment, a first item may comprise a time value, indicating the length of time, preferably in seconds, between a given reference date and the time when the protected software is installed. A second item may comprise a counter number which is initially zero and which is incremented each time that the protected program is run and the counter 16 is operated. A third item may comprise a constant which represents the number of seconds in a predetermined time period, which is one hundred twenty days in the illustrated embodiment. These data will subsequently be described in greater detail. The registration data, in the illustrated embodiment, may consist of three numbers, each containing four bytes of information, with eight bits being included per byte.

The registration data will be tested and the counter 16 will be incremented once each time that the protected software, or any module thereof, is operated, until either a predetermined number of counts is reached, or until a given period of time from the installation time expires. When the first of these two possible occurrences takes place, the counter 16 is then caused to commence decrementing once for each time that the protected program is operated, and the registration data continues to be tested for each operation of the protected program, until the counter 16 reaches zero or some other predetermined number, at which time the protected software may be disabled or destroyed.

When the protected software is initially loaded into the system via the tape cartridge 20 or the diskette 22, the registration data is added to the preselected system file SFILE. At this time, a message (see FIG. 5) is sent to the operator via the CRT 24 and the printer 26 (if one is installed) with information regarding registration of the software. The operator must acknowledge this message before he is allowed to continue with the installation. The information given states the software serial number, and what information to send, and to whom it should be sent.

When the proprietor of the protected software receives the registration data, a "defuse" number is generated from the software serial number and is returned to the user along with information as to how to defuse the checking method and thus prevent destruction of the protected software. If the protected software is registered within the first prescribed period of time, the user will have no way of knowing from the software that the checking method exists or is present in the software.

Sending of the required registration information to the proprietor of the protected software by the user will, of course, have the desired effect of informing the proprietor of the identity of this user of the protected software, and thus enable the proprietor to charge a licensing fee for the software to the user, thus realizing revenue which otherwise might not be obtained.

In the illustrated embodiment, the registration data consists of twelve bytes, comprising three integers, or "arguments", which are hereafter referred to as arg1, arg2 and arg3. These are defined as follows:

arg1—Current time (in seconds elapsed since 00:00:00 Jan. 1 1970 GMT). This number is returned from the system "time" function. This gets encrypted and becomes the installation serial number.

arg2—A counter that is initially zero. This counter is incremented each time the registration data is tested. Once the initial warning has been given (after a predetermined time has elapsed), this counter is decremented each time the registration data is tested. When the count becomes zero, the system self destruction is scheduled.

arg3—A constant that represents the number of seconds in 120 days. This value is arbitrary and should be selectively chosen for each software system on which it is installed. This number is hereafter referred to, as CONST1.

Arg3 will be modified to the following values at the times given.

CONST1—This means that the registration information has been installed, and has not yet reached the expiration values specified.

CONST1+1 —This means that the registration data has been installed and subsequently defused.

CONST1*3—This means that the registration data has been installed, and the timer and/or counter has expired. This is a flag to begin decrementing the counter rather than incrementing it when the software to be protected is executed, and to start giving warning messages.

All software modules to be protected will test the registration data in accordance with the following steps:
1. Checking the arg3 to see if the registration data has been installed.
2. Checking the current time against arg1 to see if 120 days have elapsed.
3. Incrementing arg2 and checking to see if it has reached a value of 240.

4. Checking arg3 to see if it is equal to (CONST1*3).

If any of tests one through three fail, a warning message is sent to the operator, and arg3 is set to (CONST1*3). If test four is true, arg2 is decremented and tested. When arg2 reaches zero, destruction is scheduled. The scheduled warning message appears on the system console and on the system printer.

During installation, program PROG1 is executed. One of its functions is to read the last four bytes of SFILE (arg3) and test for previous installation of the registration data. If the last four bytes are CONST1, CONST1+1, or CONST1*3 then security has been previously installed, and the timers/counters are not disturbed. If the last byte is none of these, then the security feature is installed.

Figure 7:
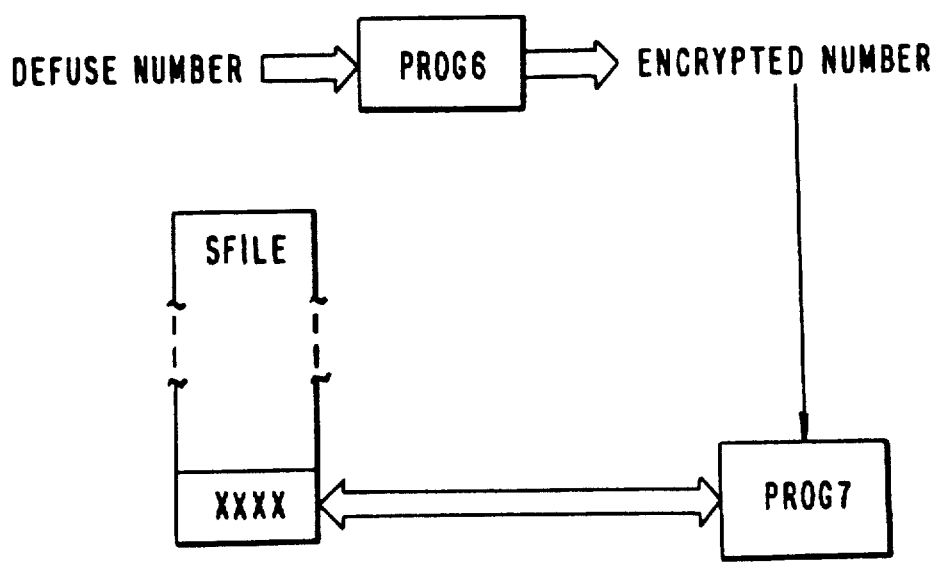
FIG. 7 is a diagram showing the relationship of programs 6 and 7 and an associated file.
Figure 5:
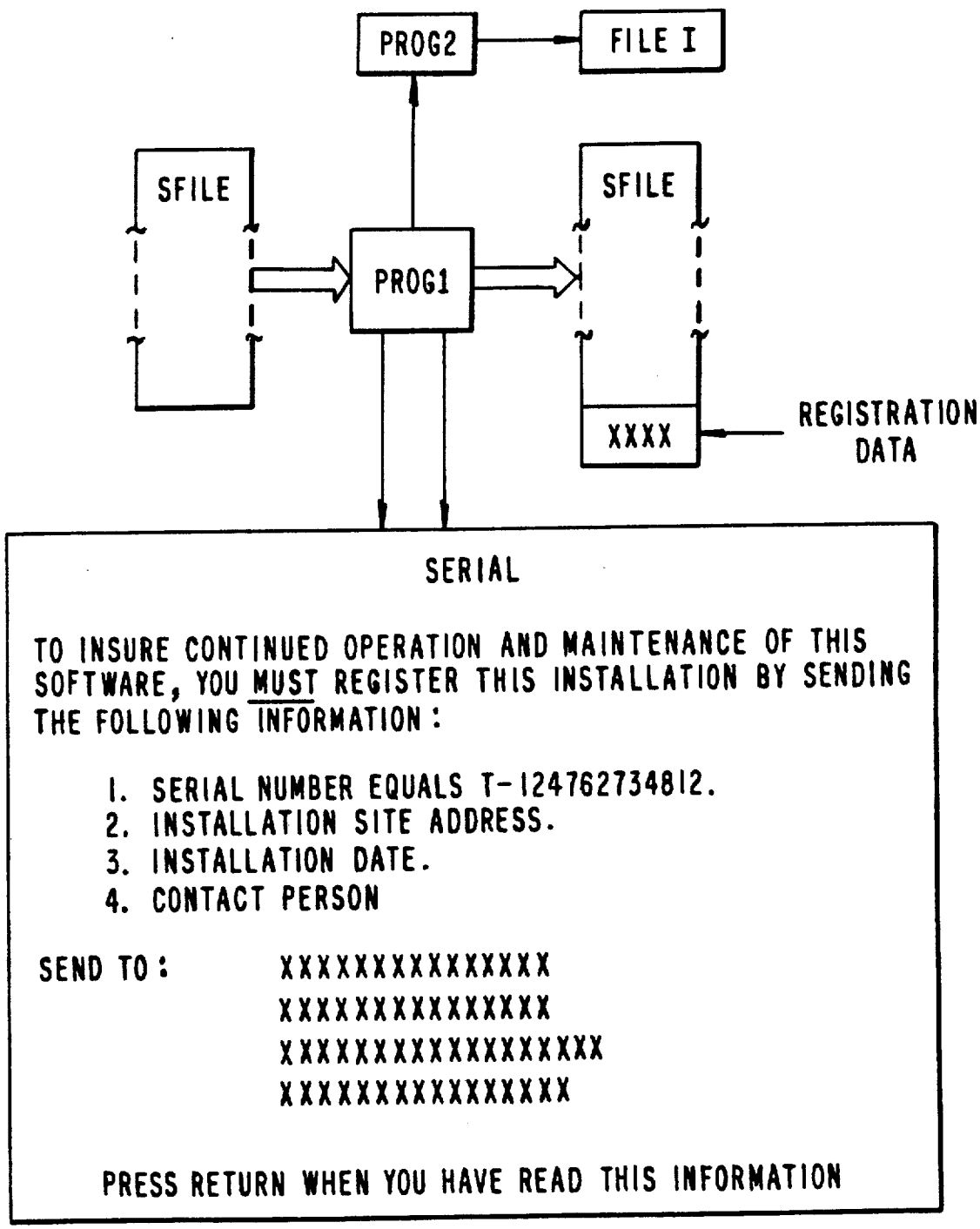
FIG. 5 is a diagram showing the relationship of programs 1 and 2 and associated files.
Figure 6:
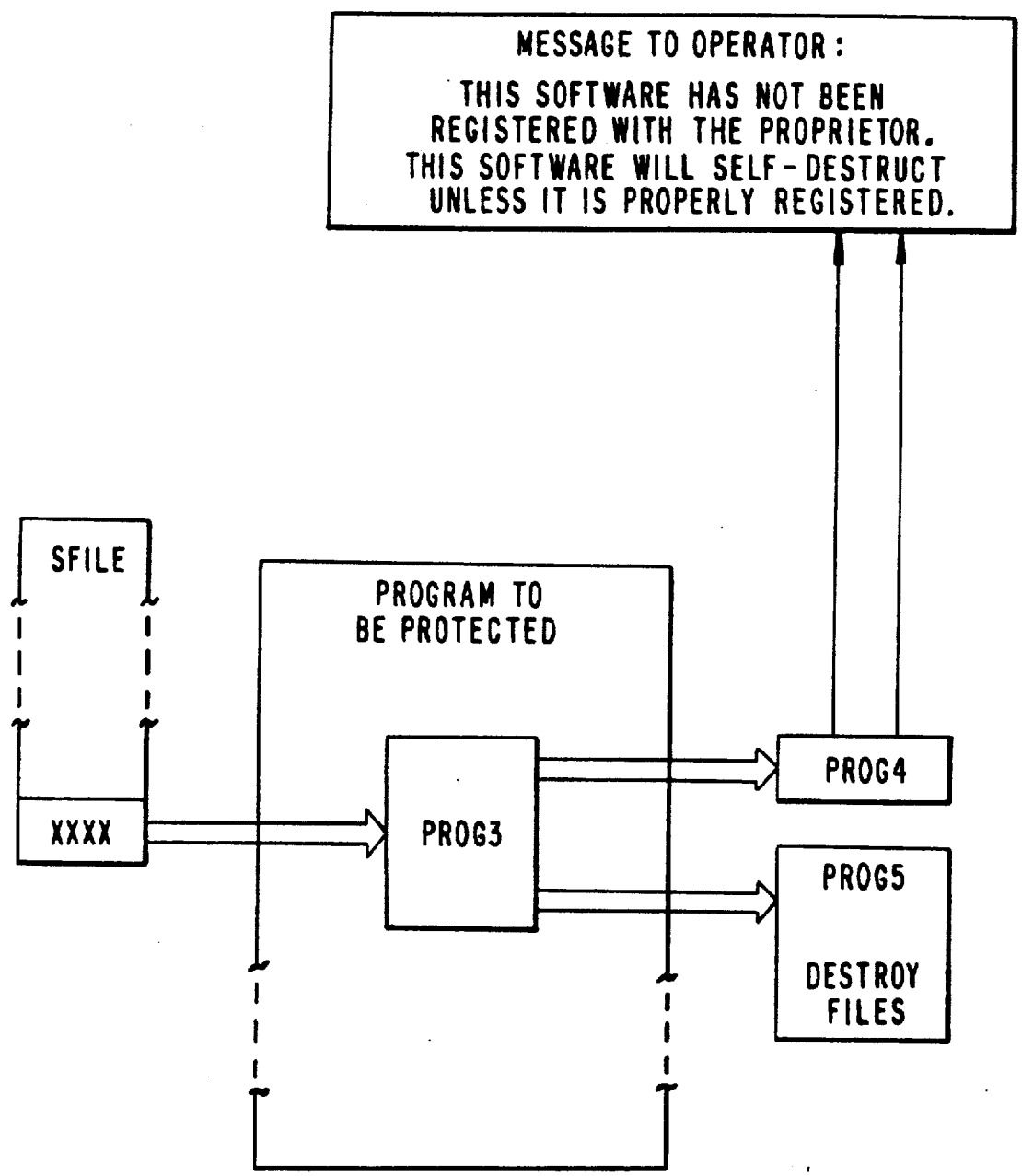
FIG. 6 is a diagram showing the relationship of programs 3, 4 and 5 and associated files.

The various modules or programs which are employed to provide security for the program to be protected will now be described. The relationship of these programs with respect to each other and to certain files containing specified information is shown in FIGS. 5, 6 and 7. The manner in which the various programs interact to provide the method which is the subject of this application will be subsequently described, and is shown in the flow diagrams of FIGS. 2, 3A, 3B and 4.

Program 1, designated as PROG1, is loaded into the system memory section 17 and the disk storage unit 18 and is operated when the software to be protected is initially installed on the system. PROG1 deletes itself from memory and disk after it has operated successfully. PROG1 performs the following steps:

1. Reads and tests SFILE to see if security is already installed.
2. If installed, skips steps 3 to 5 below.
3. If not installed:
   a. SFILE is copied for preservation.
   b. Writes CONST1, "time", and 0 as integers to the last twelve bytes of SFILE.
   c. Creates a file called FILE G that contains the encrypted serial number.
4. Executes PROG2 and then continues with PROG1.
5. Creates a file called "serial" that contains the system serial number and a message telling the user to register the system by sending the serial number and installation location to a specified name and address. The operator must acknowledge the screen before continuing. This file remains in the system in case the user does not register the system. It will be available later to reference.

Program 2, designated as PROG2, is a distraction file that serves no purpose except to distract or mislead anyone attempting to violate the registration security. PROG2 creates a second distraction file FILE I that is left in the system to further distract anyone tampering with the security. The contents of this file is arbitrary, but might contain some misleading messages. PROG2 is loaded into the system when the software to be protected is initially loaded into the system. PROG2 remains on the system disk.

Program 3, designated as PROG3, is an executable file that is included in all modules of every program that is to be protected, and is operated each time that the program to be protected is operated. It does the following:

1. Reads the last twelve bytes of SFILE to see if the security feature is installed. If it is not installed, PROG3 is exited.
2. If the security feature is installed and arg3 does not equal CONST*3, and arg3 does not equal CONST+1, then it increments the counter 16 and checks to see if the threshold or maximum allowable count for the counter has been exceeded.
3. It also compares current time with installation time.
4. If either 2 or 3 above fails, and the counter 16 has not been decremented to 0, it is decremented by one count, and then FILE D is copied, decrypted and executed as PROG4. If the counter 16 has been decremented to 0, then FILE A is copied, decrypted and executed as PROG5.

Program 4, designated as PROG4, reads file FILE E and writes it to the console, then it concatanates "serial" to FILE E and prints it. It then writes a warning message to the system printer and to the system display. PROG4 then removes files that were decrypted. PROG4 is loaded into the system when the software to be protected is installed. PROG4 is loaded as an encrypted data file FILE D. It is decrypted and operated by PROG5.

Program 5, designated as PROG5, destroys critical files in the software being protected by deleting all files that contained the installing checking program PROG3. PROG5 is loaded into the system when the software to be protected is installed. PROG5 is loaded as an encrypted data file FILE A. It is decrypted and operated by PROG3.

Program 6, designated as PROG6, is operated on instructions from the proprietor after the user has sent in a registration number. PROG6 prompts the operator to enter the defuse number received from the proprietor. PROG6 receives this number string as a parameter and writes it to FILE F. PROG6 unpacks, reverses and executes FILE C. PROG6 is loaded into the system when the software to be protected is installed.

Program 7, designated PROG7, reads file FILE F, decodes it and checks SFILE to see if this is the correct number for the current system. If it is, the system is defused. If it is not, then FILE B is copied, decrypted and executed. PROG7 is loaded into the system when the software to be protected is installed. PROG7 is loaded as an encrypted data file FILE C. It is decrypted and operated by PROG6.

Files used by the security system comprise the following:

SFILE is an arbitrary system file chosen to be the bearer of the registration data. The selected file should be one that will always reside in the system either in memory or on disk.

The "serial" file remains on the system and is in a readable printable format. It contains the following information:

1. The system serial number.
2. Registration information required by the proprietor.
3. Name and address to send registration information.

FILE A is an encrypted file that becomes PROG5 to remove protected software modules after the timer 14 or counter 16 expires.

FILE B is an encrypted file that becomes an error message that the defusing process has failed.

FILE C is an encrypted file that becomes a program to execute PROG7.

FILE D is an encrypted file that becomes PROG4 that displays an error message stating that the system was not properly registered.

FILE E is a print message file created by PROG3. It contains the registration serial number and a warning that the system has not been registered.

FILE F is created by PROG6 and is read by PROG7. It contains the encrypted defuse number.

FILE G is a print/display file containing the serial number. It is created by PROG3 and deleted by PROG5.

FILE H is a display message file created by PROG3. It contains the registration serial number and a warning that the system has not been registered.

FILE I is a file created by PROG2 to distract or mislead anyone trying illegally to defuse the security system.

The flow diagrams of FIGS. 2, 3A and 3B, and 4 show the logical flow of the three phases of the registration method. The three phases are installation, checking and defusing.

Shown in FIG. 2 is the registration installation. This program PROG1 (block 28) is executed during installation of the software to be protected. As represented in blocks 30 and 32, the program examines SFILE and checks to see whether or not the last twelve bytes of SFILE contain the registration data, and whether the last four bytes contain CONST1, CONST+1 or CONST1 times three. If so, the program proceeds to the exit designated block 34. If not, PROG2 is executed and FILE I is created, as represented in block 36. It should be noted that this could be omitted or placed anywhere else in the system, since it is for the purpose of distraction only.

Next, as represented in block 38, the registration is installed, and the system serial number is generated and is written to FILE G. The last twelve bytes of SFILE are written to be arg1, arg2 and arg3, as described above.

Finally, as represented in block 40, the file "serial" is created, and a message is displayed and/or printed, telling the user to register his installation with the proprietor, and telling him what information to send and where to send it. Following this, PROG1 proceeds to the exit, represented by block 34.

Figure 3A:
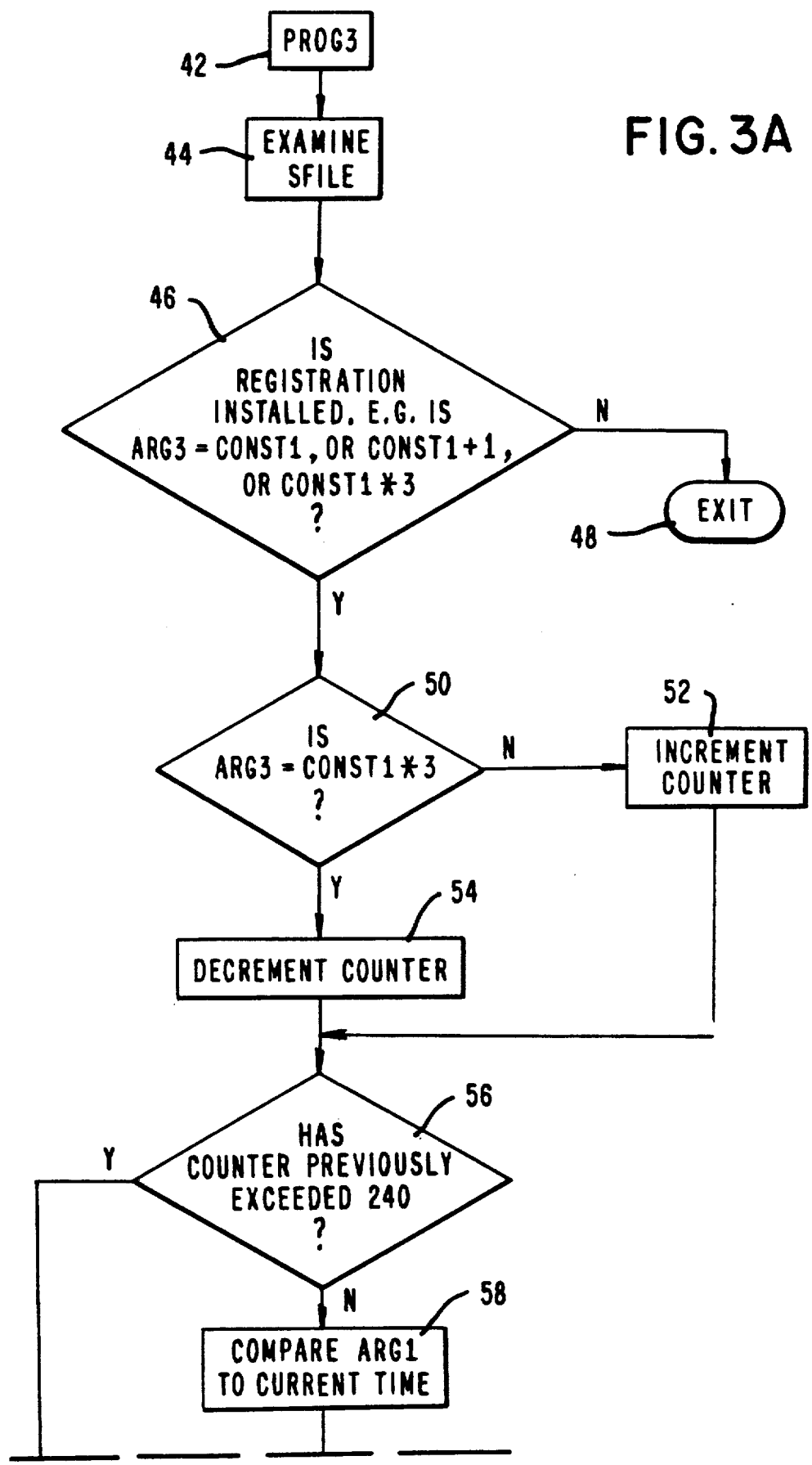
FIGS. 3A and 3B, taken together constitute a flow diagram of the registration checking phase of the method for software protection.
Figure 3B:
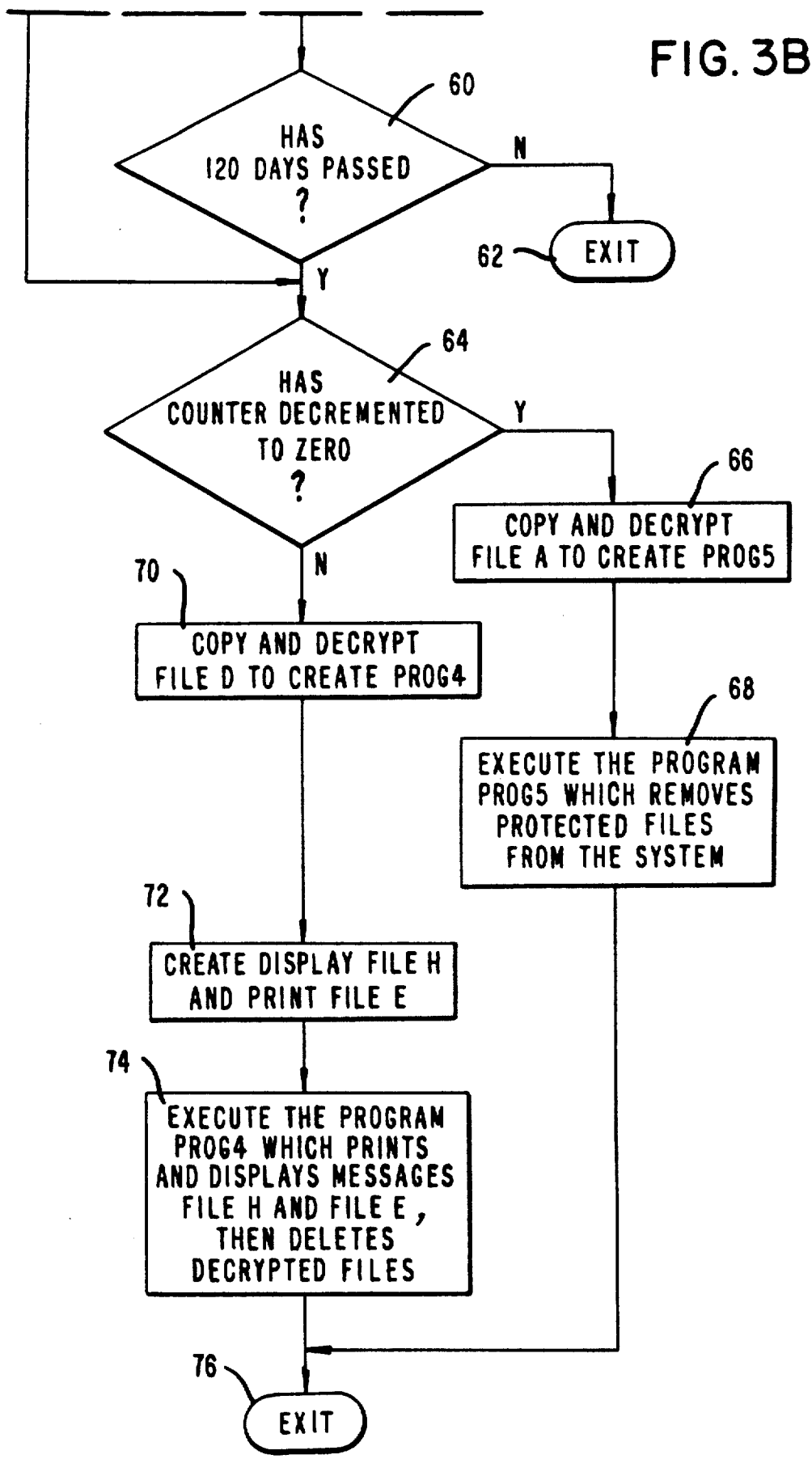

Shown in FIGS. 3A and 3B is the registration checking. Each module of the protected program that checks the registration data performs the sequence described below, which is contained in program PROG3 (block 42).

As represented in block 44, the program first examines SFILE to see if the registration is installed, and then (block 46), if the registration is not installed, or if thresholds are exceeded, exits (block 48). If arg3 equals CONST1 or CONST1+1 or CONST1*3, the process proceeds to block 50, where it is determined whether arg3 equals CONST1*3. If so, the counter is decremented (block 54). If not, the counter is incremented one count for each operation of the program (block 52) until it reaches a predetermined arbitrary value (240 in the illustrated embodiment) and then commences to decrement (block 54). Next, the counter is checked to see if it has previously exceeded 240. If so, the process proceeds to block 64 to see if the count is currently zero. If the counter has never incremented past 240, arg1 is compared to current time (block 58), and a determination is made (block 60) as to whether 120 days have passed. The value of 120 days is a predetermined arbitrary value selected in the illustrated embodiment. If 120 days have not passed, the program is exited, as per block 62. If 120 days have passed, the process continues to block 64, in which it is determined whether the counter has decremented to zero. If the counter has not decremented to zero, a warning message is given to the system CRT and/or to the printer. FILE D is copied and decrypted to create PROG4 (block 70). Display file FILE H and print file FILE E are created (block 72). The program PROG4 is then executed (block 74), which prints and displays the messages of FILE H and FILE E, and then deletes these decrypted files, after which the program is exited (block 76). If the counter has decremented to zero, FILE A is copied and decrypted to create PROG5 (block 66). PROG5 is then executed, which destroys or disables the critical files of the protected program (block 68), after which the program is exited (block 76).

Figure 4:
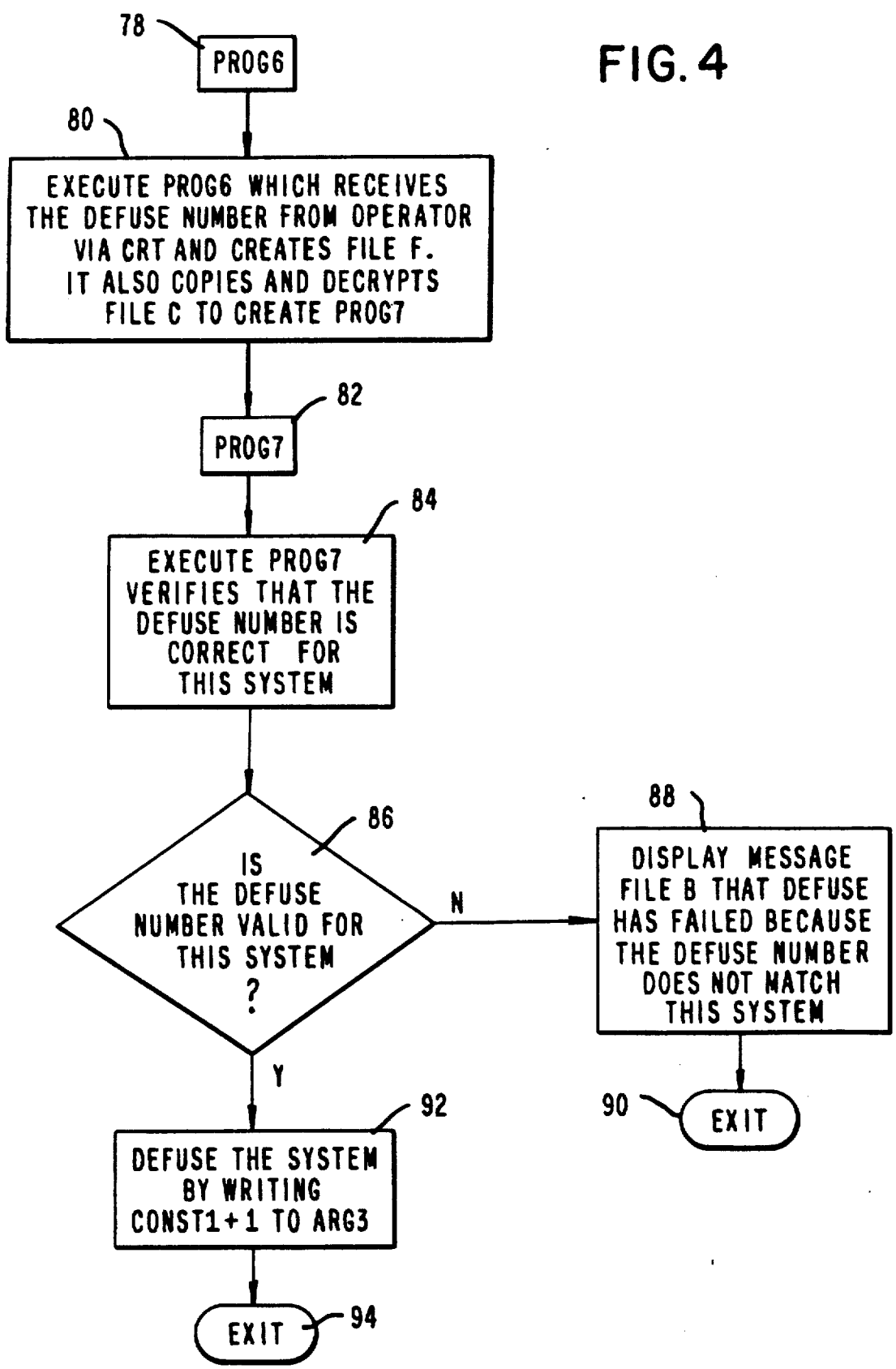
FIG. 4 is a flow diagram of the registration defusing phase of the method for software protection.

Shown in FIG. 4 is the registration defusing program. When a system has been registered, the proprietor sends the user a number which is to be used for defusing the registration protection. Each defuse number will work only on the system which was registered. The operating sequence is embodied in programs PROG6 (block 78) and PROG7 (block 82) and is described below.

PROG6 prompts the operator to enter the defuse number received from the proprietor. The defuse number is received and FILE F is created. As shown in block 80, PROG6 also copies and decrypts FILE C to create PROG7 (block 82). As shown in block 84, PROG7 is executed and compares the defuse number to arg1 in a predetermined manner to verify that the defuse number is correct for this system. This comparison is represented in block 86. If the comparison fails, the message of FILE B is displayed, stating that the defuse has failed because the defuse number does not match this system (block 88) and the program is exited (block 90).

If the defuse number is found to be valid for this system, the system is defused by writing CONST1+1 to arg3 (block 92) and the program is exited (block 94).

While the invention has been shown and described in terms of a preferred embodiment thereof, it will be understood that this invention is not limited to this particular embodiment and that many changes and modification may be made without departing from the true spirit and scope of the invention as defined in the appended claims.

What is claimed is:

1. A method for preventing continued unauthorized use of protected computer software in a data processing system including a clock, storage means and a counter comprising the steps of:

providing an initial time setting for said clock at the time of installation of the software in said data processing system;

providing a constant representing a predetermined amount of time in said storage means at the time of installation of the software;

incrementing the counter each time that the protected software is operated;

making a first determination whenever the protected software is operated as to whether the constant has been provided in the data processing system;

making a second determination as to whether the counter has reached a predetermined value;

making a third determination as to whether the current time sensed from said clock exceeds the time when the software was installed by an amount equal to or greater than said constant;

if any of the first, second or third determinations are true, sending a warning message to the software user indicating unauthorized use, setting the constant to a predetermined multiple of the current time setting, and switching the counter to cause it to commence decrementing from the setting at which it stood when switched;

decrementing the counter each further time that the software is subsequently operated; and causing the software to be disabled when the counter has been decremented to a second predetermined value.

2. The method of claim 1 in which the second predetermined value of the counter is zero.

3. The method of claim 1 in which the sending of a warning message to the software user includes displaying a message telling the user to register the installation.

4. The method of claim 1 in which the sending of a warning message to the software user includes printing a message telling the user to register the installation.

5. The method of claim 1, in which the warning message is stored in an encrypted manner and is decrypted before sending.

6. The method of claim 1, also including the steps of:
   obtaining a defusing number from the proprietor of the software; and
   entering the defusing number into the data processing system to render the disabling feature of the software inoperable.

7. The method of claim 6, in which the defusing number is unique for the specific installation with which the protected software is used.

8. The method of claim 7, in which the defusing number is derived from the initial time setting.

9. The method of claim 6, also including the step of providing a message when an invalid defusing number is entered.

* * * * *